United States Patent
Zhang et al.

(10) Patent No.: US 12,445,047 B2
(45) Date of Patent: Oct. 14, 2025

(54) SNUBBER CIRCUIT

(71) Applicants: SEMES CO., LTD., Cheonan-si (KR); Korea Advanced Institute Of Science And Technology, Daejeon (KR)

(72) Inventors: Aixian Zhang, Hwaseong-si (KR); Junghwan Lee, Ansan-si (KR); Jaehyun Kim, Daejeon-si (KR); Jiho Lee, Daejeon-si (KR); Gyuhyeong Cho, Daejeon-si (KR)

(73) Assignees: SEMES CO., LTD., Cheonan-si (KR); Korea Advanced Institute Of Science And Technology, Daejeon (KR)

( * ) Notice: Subject to any disclaimer, the term of this patent is extended or adjusted under 35 U.S.C. 154(b) by 123 days.

(21) Appl. No.: 18/395,263

(22) Filed: Dec. 22, 2023

(65) Prior Publication Data

US 2024/0223073 A1  Jul. 4, 2024

(30) Foreign Application Priority Data

Dec. 30, 2022 (KR) .......................... 10-2022-0191051

(51) Int. Cl.
| | |
|---|---|
| *H05B 45/37* | (2020.01) |
| *H02M 1/34* | (2007.01) |
| *H02M 3/158* | (2006.01) |
| *H05H 1/46* | (2006.01) |

(52) U.S. Cl.
CPC .......... *H02M 1/346* (2021.05); *H02M 3/158* (2013.01); *H05H 1/4645* (2021.05)

(58) Field of Classification Search
CPC ..... H02M 1/346; H02M 3/158; H05H 1/4645
See application file for complete search history.

(56) References Cited

U.S. PATENT DOCUMENTS

| | | | | |
|---|---|---|---|---|
| 5,278,748 | A | * | 1/1994 | Kitajima ........... H02M 3/33592 363/21.02 |
| 8,462,524 | B2 | | 6/2013 | Gekeler |
| 10,672,590 | B2 | | 6/2020 | Long et al. |

FOREIGN PATENT DOCUMENTS

| | | |
|---|---|---|
| JP | 07264851 | 10/1995 |
| JP | 2010080844 | 4/2010 |
| KR | 10-0590075 | 6/2006 |
| KR | 10-0864706 | 10/2008 |
| KR | 10-1122067 | 3/2012 |
| KR | 10-1272794 | 6/2013 |
| KR | 10-2014-0013123 | 2/2014 |
| KR | 10-1759258 | 7/2017 |

(Continued)

OTHER PUBLICATIONS

Abramovitz, A., State-Plane Analysis of Regenerative Snubber for Flyback Converters, Nov. 2013.

(Continued)

*Primary Examiner* — Henry Luong

(57) ABSTRACT

Provided is a snubber circuit. The snubber circuit may include a first snubber diode connected to a first node connected to a DC-DC converter, a snubber capacitor connected between the first snubber diode and a second node connected to the DC-DC converter, a snubber voltage source connected to the first node, a snubber inductor connected to a third node between the first snubber diode and the snubber capacitor, and a second snubber diode connected between the snubber inductor and the snubber voltage source.

20 Claims, 19 Drawing Sheets

(56) References Cited

FOREIGN PATENT DOCUMENTS

KR         10-1922015     11/2018
KR   10-2020-0121909   10/2020

OTHER PUBLICATIONS

Notice of Allowance from the Korean Intellectual Property Office dated Oct. 30, 2024.
Interleaved Buck Converters with a Single-Capacitor Turn-Off Snubber, IEEE, Jun. 10, 2024.
Office Action from the Korean Intellectual Property Office dated Mar. 19, 2024.

\* cited by examiner

SNUBBER CIRCUIT

CROSS-REFERENCE TO RELATED APPLICATIONS

This application is based on and claims priority under 35 U.S.C. § 119 to Korean Patent Application No. 10-2022-0191051, filed on Dec. 30, 2022, in the Korean Intellectual Property Office, the disclosure of which is incorporated by reference herein in its entirety.

BACKGROUND

1. Field

The disclosure relates to a snubber circuit, and more particularly, to a snubber circuit capable of operating in a three or more levels DC-DC converter.

2. Description of the Related Art

DC-DC converters are important components in electronic devices that essentially require an input voltage of a proper level. DC-DC converters may be used in various fields including mobile devices, Internet of Things (IoT) devices, memory, power management integrated circuits (PMICs), battery chargers, etc. More specifically, as electronic devices use limited power, conversion of limited energy with high efficiency is required, and it is necessary to improve the reliability of power elements included in the electronic devices by minimizing the switching heat.

SUMMARY

Provided is a high-efficiency snubber circuit capable of increasing the reliability of power elements by minimizing switching noise and switching heat in a DC-DC converter.

Additional aspects will be set forth in part in the description which follows and, in part, will be apparent from the description, or may be learned by practice of the presented embodiments of the disclosure.

According to one or more embodiments, provided is a snubber circuit. According to an aspect of the disclosure, a snubber circuit includes a first snubber diode connected to a first node connected to a DC-DC converter, a snubber capacitor connected between the first snubber diode and a second node connected to the DC-DC converter, a snubber voltage source connected to the first node, a snubber inductor connected to a third node between the first snubber diode and the snubber capacitor, and a second snubber diode connected between the snubber inductor and the snubber voltage source.

The snubber voltage source may be configured to supply a voltage that is 0.25 times an input voltage of the DC-DC converter.

The snubber capacitor may be connected in parallel to a parasitic capacitor of a switch included in the DC-DC converter.

A capacitance of the snubber capacitor may be 10 times or more than a capacitance of a parasitic capacitor of a switch included in the DC-DC converter.

When a voltage at both ends of the snubber inductor is 0.25 times an input voltage of the DC-DC converter, resonance may occur in the snubber inductor and the snubber capacitor.

The snubber capacitor may be charged according to the resonance.

When a voltage at both ends of the snubber inductor is −0.25 times an input voltage of the DC-DC converter, a current of the snubber inductor may become 0 A.

When a conversion ratio of the DC-DC converter is less than 0.5, and the current of the snubber inductor becomes 0 A, the snubber capacitor may be charged to a voltage that is 0.5 times the input voltage of the DC-DC converter, and when the conversion ratio of the DC-DC converter is greater than 0.5, and the current of the snubber inductor becomes 0 A, the snubber capacitor may be charged to a voltage that is identical to the input voltage of the DC-DC converter.

When the conversion ratio of the DC-DC converter is less than 0.5, and a switch of the DC-DC converter is turned off, the snubber capacitor charged to the voltage that is 0.5 times the input voltage of the DC-DC converter may be discharged to 0 V, and when the conversion ratio of the DC-DC converter is greater than 0.5, and the switch of the DC-DC converter is turned off, the snubber capacitor charged to the voltage that is identical to the input voltage of the DC-DC converter may be discharged to the voltage that is 0.5 times the input voltage of the DC-DC converter.

When a conversion ratio of the DC-DC converter is less than 0.5, a voltage of the first node may be maintained to be 0.5 times an input voltage of the DC-DC converter or at 0 V, and when the conversion ratio of the DC-DC converter is greater than 0.5, the voltage of the first node may be maintained to be identical to or 0.5 times the input voltage of the DC-DC converter.

When a switch of the DC-DC converter is turned off, a voltage slope at both ends of the switch according to time may be determined based on a size of a capacitance of the snubber capacitor and an inductor current of the DC-DC converter.

According to another aspect of the disclosure, a snubber circuit includes a snubber capacitor connected in parallel to a parasitic capacitor of a switch of a DC-DC converter, a snubber inductor configured to cause resonance with the snubber capacitor, a first snubber diode, a second snubber diode, and a snubber voltage source, wherein the snubber capacitor may be discharged when the switch of the DC-DC converter is turned off.

The snubber voltage source may be configured to supply a voltage that is 0.25 times an input voltage of the DC-DC converter.

A capacitance of the snubber capacitor may be 10 times or more than a capacitance of a parasitic capacitor of a switch included in the DC-DC converter.

When a voltage at both ends of the snubber inductor is 0.25 times an input voltage of the DC-DC converter, resonance may occur in the snubber inductor and the snubber capacitor.

The snubber capacitor may be charged according to the resonance.

When a conversion ratio of the DC-DC converter is less than 0.5, and the current of the snubber inductor becomes 0 A, the snubber capacitor may be charged to a voltage that is 0.5 times the input voltage of the DC-DC converter, and when the conversion ratio of the DC-DC converter is greater than 0.5, and the current of the snubber inductor becomes 0 A, the snubber capacitor may be charged to a voltage that is identical to the input voltage of the DC-DC converter.

When the conversion ratio of the DC-DC converter is less than 0.5, and a switch of the DC-DC converter is turned off, the snubber capacitor charged to the voltage that is 0.5 times the input voltage of the DC-DC converter may be discharged to 0 V, and when the conversion ratio of the DC-DC converter is greater than 0.5, and the switch of the DC-DC converter is turned off, the snubber capacitor charged to the voltage that is identical to the input voltage of the DC-DC converter may be discharged to the voltage that is 0.5 times the input voltage of the DC-DC converter.

When a switch of the DC-DC converter is turned off, a voltage slope at both ends of the switch according to time may be determined based on a size of a capacitance of the snubber capacitor and an inductor current of the DC-DC converter.

According to another aspect of the disclosure, a snubber circuit includes a first snubber diode connected to a first node connected to a DC-DC converter, a snubber capacitor connected between the first snubber diode and a ground node, a snubber voltage source connected to the first node, a second snubber diode connected in series to the snubber voltage source, and a snubber inductor connected in series to the second snubber diode.

According to another aspect of the disclosure, a plasma generator includes a DC-DC converter configured to generate a middle voltage by converting an input direct current (DC) voltage, a snubber circuit connected to the DC-DC converter, a radio frequency (RF) generator configured to generate an alternating current (AC) voltage in response to receiving the middle voltage, and a chamber in which plasma is generated based on the AC voltage, wherein the snubber circuit may include a first snubber diode connected to a first node connected to the DC-DC converter, a snubber capacitor connected between the first snubber diode and a second node connected to the DC-DC converter, a snubber voltage source connected to the first node, a snubber inductor connected to a third node between the first snubber diode and the snubber capacitor, and a second snubber diode connected between the snubber inductor and the snubber voltage source.

The DC-DC converter may be configured to generate, based on an input voltage, the middle voltage by increasing a voltage while forming a voltage slope.

The snubber voltage source may be configured to supply a voltage that is 0.25 times an input voltage of the DC-DC converter.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
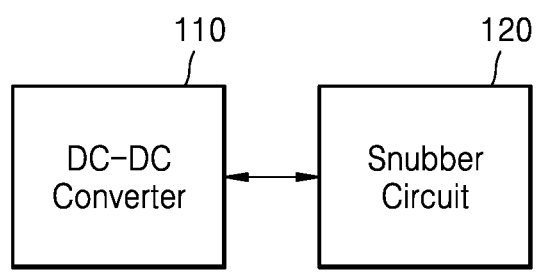
FIG. 1 is a block diagram of a snubber circuit and a DC-DC converter according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure are described in detail with reference to the accompanying drawings. The advantages, features of the disclosure and methods for achieving the same may be clarified by referring to the following detailed embodiments along with the drawings. However, the disclosure is not limited by the following embodiments and may be implemented in various forms. Rather, the embodiments are provided so that this disclosure will be thorough and complete, and will fully convey the scope of embodiments to one of ordinary skill in the art. The disclosure is defined by the scope of claims. Throughout the specification, like reference numerals denote like components.

It will be understood that when an element or layer is referred to as being "on" or "above" another element or layer, the element or layer can be directly on the other element or layer or intervening elements may also be present. On the other hand, when an element is referred to as being "directly on" another element no other element or layer may be present therebetween.

Spatially relative terms such as "below," "beneath," "lower," "above," "upper," etc. may be used to readily describe relations between an element or component and other elements or components as illustrated in the drawings. These spatially relative terms should be understood as encompassing, in addition to a direction of an element illustrated in the drawings, other possible directions of the element when it is used or operated. For example, when elements illustrated in the drawings are turned upside down, an element described as being "below" or "beneath" another element may be "above" the other element. Thus, the exemplary language of "below" or "beneath" may mean being below or beneath in both of downward direction and upward direction. An element may be oriented in different directions, and the spatially relative terms may be translated according to their orientation.

While such terms as "first," "second," etc., may be used to describe various elements, components, and/or sections, such elements, components, and/or sections must not be limited to the above terms. The above terms are used only to distinguish one element, component, or section from another element, component, or section. Accordingly, a first element, a first component, or a first section mentioned below may also be a second element, a second component, or a second section, respectively, within the technical ideas of the disclosure.

The terms used herein are merely used to describe the embodiments and are not intended to limit the disclosure. An expression used in the singular encompasses the expression of the plural, unless it has a clearly different meaning in the context. In the specification, it is to be understood that the terms such as "comprises and/or "comprising" are not intended to exclude the possibility that one or more other components, steps, operations and/or elements may exist or may be added in addition to the mentioned components, steps, operations and/or elements.

Unless otherwise defined, all terms (technical and scientific terms) used in the specification may be used in their respective meanings that can be commonly understood by a person skilled in the art. Further, the general terms defined by dictionaries shall not be interpreted in an ideal or excessive manner unless explicitly defined.

Hereinafter, embodiments of the disclosure will be described in detail with reference to the attached drawings. In describing the embodiments, like reference numerals denote like or corresponding components regardless of numerals shown in the drawings, and any redundant description will be omitted.

FIG. 1 is a block diagram of a snubber circuit and a DC-DC converter according to an embodiment.

A snubber circuit 120 according to an embodiment may be connected to a DC-DC converter 110. For example, the snubber circuit 120 may be connected to a 3-level buck converter; however, the disclosure is not limited thereto.

The snubber circuit 120 may be connected to a DC-DC converter and configured to minimize switching noise and switching heat in a switch included in the DC-DC converter. More specifically, when the switch of the DC-DC converter is turned off, the snubber circuit 120 may form a voltage slope at the switch according to time and prevent a momentary excessive application of voltage to the switch.

The snubber circuit 120 may include a first snubber diode, a second snubber diode, a snubber capacitor, a snubber voltage source, and a snubber inductor. A detailed description of the components of the snubber circuit 120 will be provided later.

Figure 2:
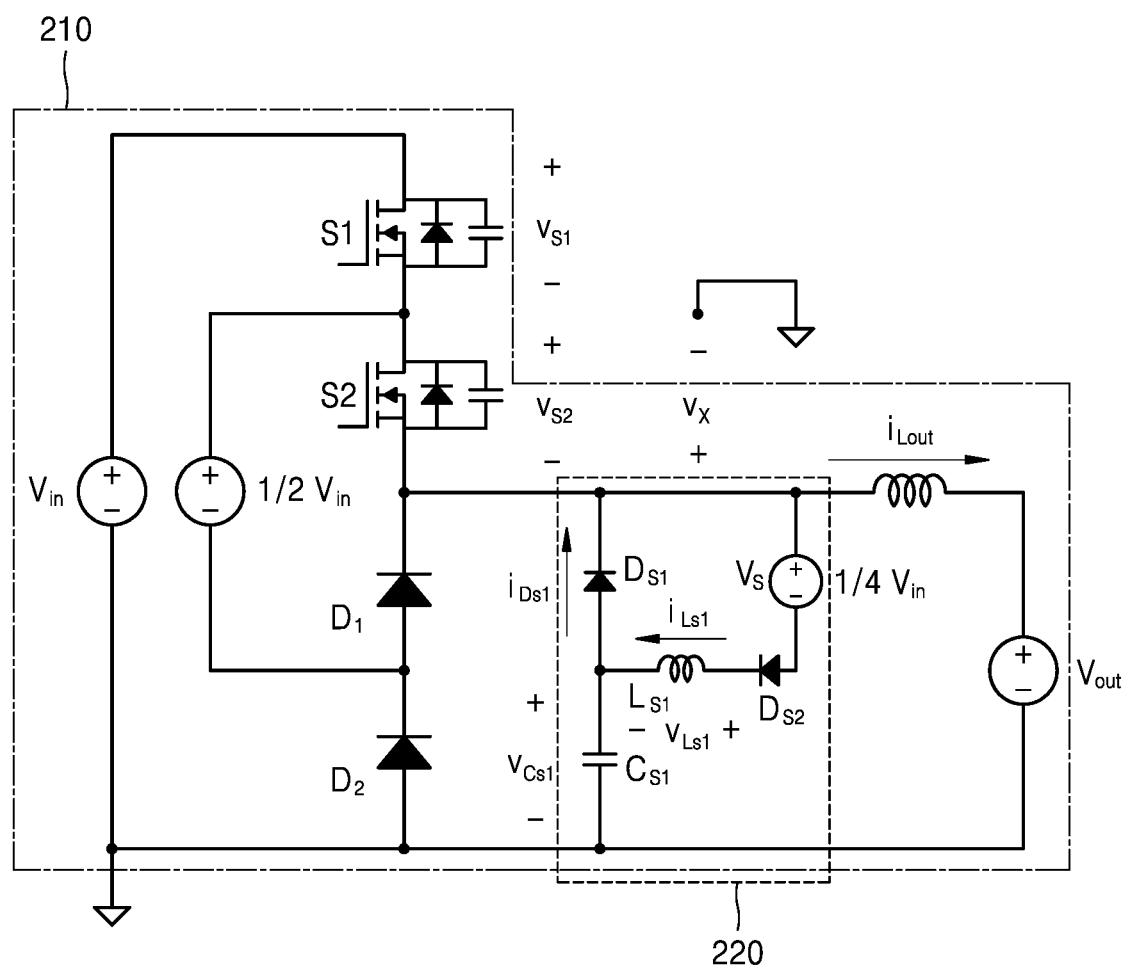
FIG. 2 is a diagram of a snubber circuit and a DC-DC converter according to an embodiment.

FIG. 2 is a diagram of a snubber circuit and a DC-DC converter according to an embodiment.

A snubber circuit 220 according to an embodiment may be connected to a DC-DC converter 210. More specifically, the DC-DC converter 210 may be a 3-level buck converter; however, the disclosure is not limited thereto. Hereinafter, the snubber circuit according to an embodiment that is connected to a 3-level buck converter and operates accordingly is described for convenience in explanation.

The snubber circuit 220 may include a first snubber diode $D_{s1}$, a second snubber diode $D_{s2}$, a snubber voltage source $V_s$, a snubber inductor $L_{s1}$, and/or a snubber capacitor $C_{s1}$. As such, the snubber circuit 220 may include passive elements. As the snubber circuit 220 includes passive elements, the design thereof may be simple and no separate controller to operate the snubber circuit 220 may be needed. In other words, a controller controlling the DC-DC converter 210 may control the snubber circuit 220, and as no additional controller is needed, the stability of a system may be guaranteed.

The first snubber diode $D_{s1}$ may be connected to a first node $V_x$ connected to the DC-DC converter. The first snubber diode $D_{s1}$ may be a diode for determining a current path to perform charging and discharging of the capacitor at a desired time. When the DC-DC converter is a 3-level buck converter, the first node $V_x$ may be, for example, a node to which a voltage having the same level as an input voltage, a voltage that is 0.5 times the input voltage, and 0V may be applied.

The snubber capacitor $C_{s1}$ may be connected between the first snubber diode $D_{s1}$ and a second node connected to the DC-DC converter. The second node may be a ground node.

In addition, the snubber capacitor $C_{s1}$ may be connected in parallel to a parasitic capacitor included in a switch (S1 and S2) of the DC-DC converter 210. The snubber capacitor $C_{s1}$ may have a capacitance that is sufficiently greater than a capacitance of the parasitic capacitor of the switch (S1 and S2) included in the DC-DC converter 210. For example, the snubber capacitor $C_{s1}$ may have a capacitance that is 10 times or more than the capacitance of the parasitic capacitor of the switch (S1 and S2) included in the DC-DC converter 210. Accordingly, the snubber capacitor $C_{s1}$ may be discharged when the switch (S1 and S2) of the DC-DC converter 210 is turned off, and form a voltage slope at the switch (S1 and S2 according to time, which may prevent momentary excessive application of voltage to the switch.

The snubber voltage source $V_s$ may be connected to the first node $V_x$. The snubber voltage source $V_s$ may be a voltage source supplying a voltage that is 0.25 times an input voltage $V_{in}$ of the DC-DC converter 210. The snubber voltage source $V_s$ may be a voltage source which allows the snubber circuit 220 to cause snubber effects in full range of the DC-DC converter 210 (conversion ratio (CR)<0.5 and CR>0.5). More specifically, the snubber voltage source $V_s$ may allow the snubber capacitor to be charged to the input voltage of the DC-DC converter 210 when the CR of the DC-DC converter 210 is greater than 0.5. Specific operations of the snubber capacitor and the snubber voltage source will be described later.

The snubber inductor $L_{s1}$ may be connected to a third node between the first snubber diode $D_{s1}$ and the snubber capacitor $C_{s1}$.

The snubber inductor $L_{s1}$ may cause resonance with the snubber capacitor $C_{s1}$. By the resonance of the snubber inductor $L_{s1}$ and the snubber capacitor $C_{s1}$, the snubber capacitor $C_{s1}$ may be charged. When the snubber capacitor $C_{s1}$ is charged by using a separate switch, parasitic resistance of the switch may cause power loss; however, as the snubber circuit 220 according to an embodiment charges the snubber capacitor $C_{s1}$ through the resonance of the snubber inductor $L_{s1}$ and the snubber capacitor $C_{s1}$, relatively high efficiency may be secured.

The second snubber diode $D_{s2}$ may be connected between the snubber inductor $L_{s1}$ and the snubber voltage source $V_s$. Similar to the first snubber diode $D_{s1}$, the second snubber diode $D_{s2}$ may be a diode for determining a current path to perform charging and discharging of the capacitor at a desired time.

Figure 3A:
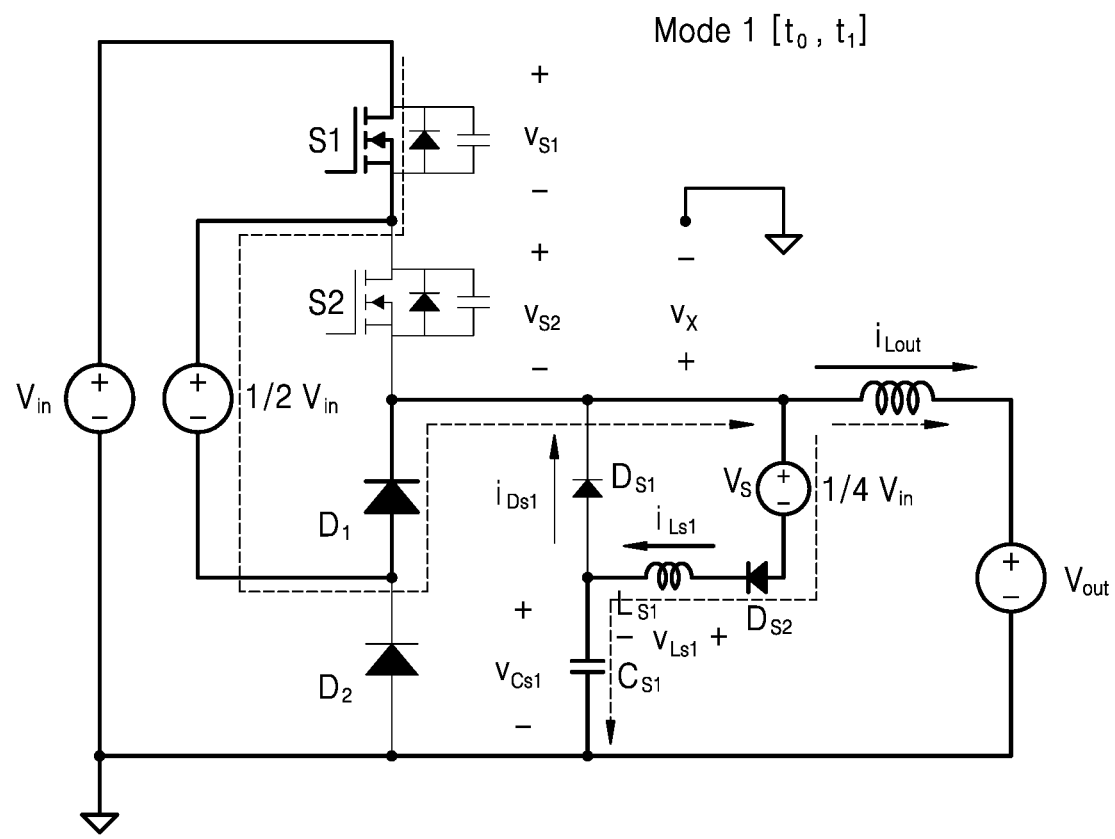
FIG. 3A is a diagram of a snubber circuit and a DC-DC converter according to an embodiment.

FIG. 3A is a diagram of a snubber circuit and a DC-DC converter according to an embodiment. Hereinafter, embodiments are described in relation to FIGS. 3A and 4.

In FIG. 3A, the bold solid line may represent a current path in which a current flows. Moreover, the dotted line in FIG. 3A may represent a flow of an inductor current $i_{Lout}$.

Hereinafter, the example in which the snubber circuit according to an embodiment is connected to a 3-level buck converter, which is a DC-DC converter, and operates accordingly is described for convenience in explanation.

Mode 1 represents some of the operations of the snubber circuit when the CR of the DC-DC converter is less than 0.5. Mode 1 may correspond to operations from a time point t0 to a time point t1 in FIG. 4.

Mode 1 may be a process to initialize the snubber capacitor $C_{s1}$ from 0 V to a voltage that is 0.5 times the input voltage $V_{in}$ of the DC-DC converter (i.e., $0.5V_{in}$). In Mode 1, the switch S1 of the DC-DC converter may be changed from a turn-off state to a turn-on state, and a diode $D_2$ of the DC-DC converter may be changed from a turn-on state to a turn-off state. When the switch S1 is turned on, the voltage of the first node $V_x$ may be $0.5*V_{in}$. In this regard, the initial voltage at both ends of the snubber inductor $L_{s1}$ may be $0.25*V_{in}$. In addition, resonance may occur in the snubber inductor $L_{s1}$ and the snubber capacitor $C_{s1}$. By the resonance of the snubber inductor $L_{s1}$ and the snubber capacitor $C_{s1}$, the snubber capacitor $C_{s1}$ may be charged. The resonance of the snubber inductor $L_{s1}$ and the snubber capacitor $C_{s1}$ may be due to the snubber voltage source $V_s$, the snubber inductor $L_{s1}$, and the snubber capacitor $C_{s1}$.

The current of the snubber inductor $L_{s1}$ may increase when the voltage at both ends of the snubber inductor $L_{s1}$ is $0.25*V_{in}$, and when the voltage at both ends of the snubber inductor $L_{s1}$ is $-0.25*V_{in}$, the current of the snubber inductor $L_{s1}$ may be initialized to 0. This may occur at the same time point when the snubber capacitor $C_{s1}$ is charged to $0.5*V_{in}$. The snubber capacitor $C_{s1}$ may be charged according to the resonance with the snubber inductor $L_{s1}$ without separate control.

Figure 3B:
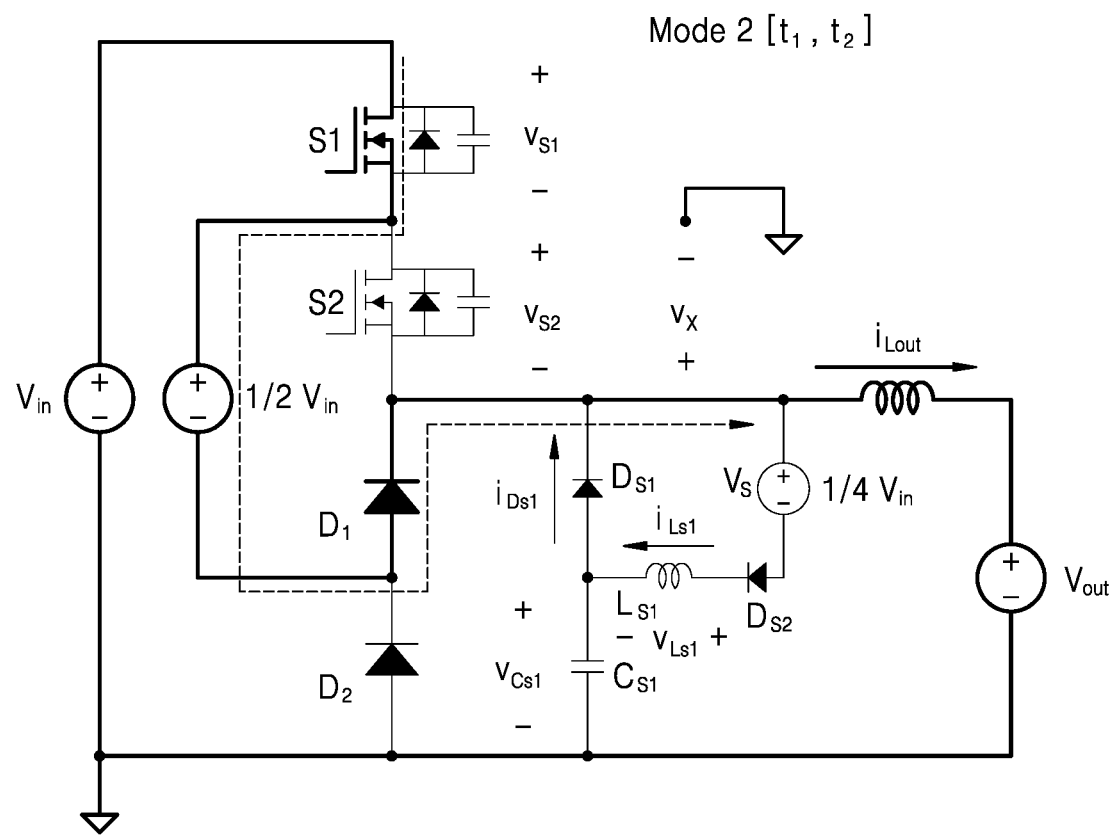
FIG. 3B is a diagram of a snubber circuit and a DC-DC converter according to an embodiment.

FIG. 3B is a diagram of a snubber circuit and a DC-DC converter according to an embodiment. Hereinafter, embodiments are described in relation to FIGS. 3B and 4.

In FIG. 3B, the bold solid line may represent a current path in which a current flows. Moreover, the dotted line in FIG. 3B may represent a flow of the inductor current $i_{Lout}$.

Mode 2 represents some of operations of the snubber circuit when the CR of the DC-DC converter is less than 0.5. Mode 2 may correspond to operations from the time point t1 to a time point t2 in FIG. 4.

After the snubber capacitor $C_{s1}$ is charged to $0.5*V_{in}$ in Mode 1, the second snubber diode $D_{s2}$ may be turned off. Accordingly, the current may flow only among the components of the DC-DC converter.

Figure 3C:
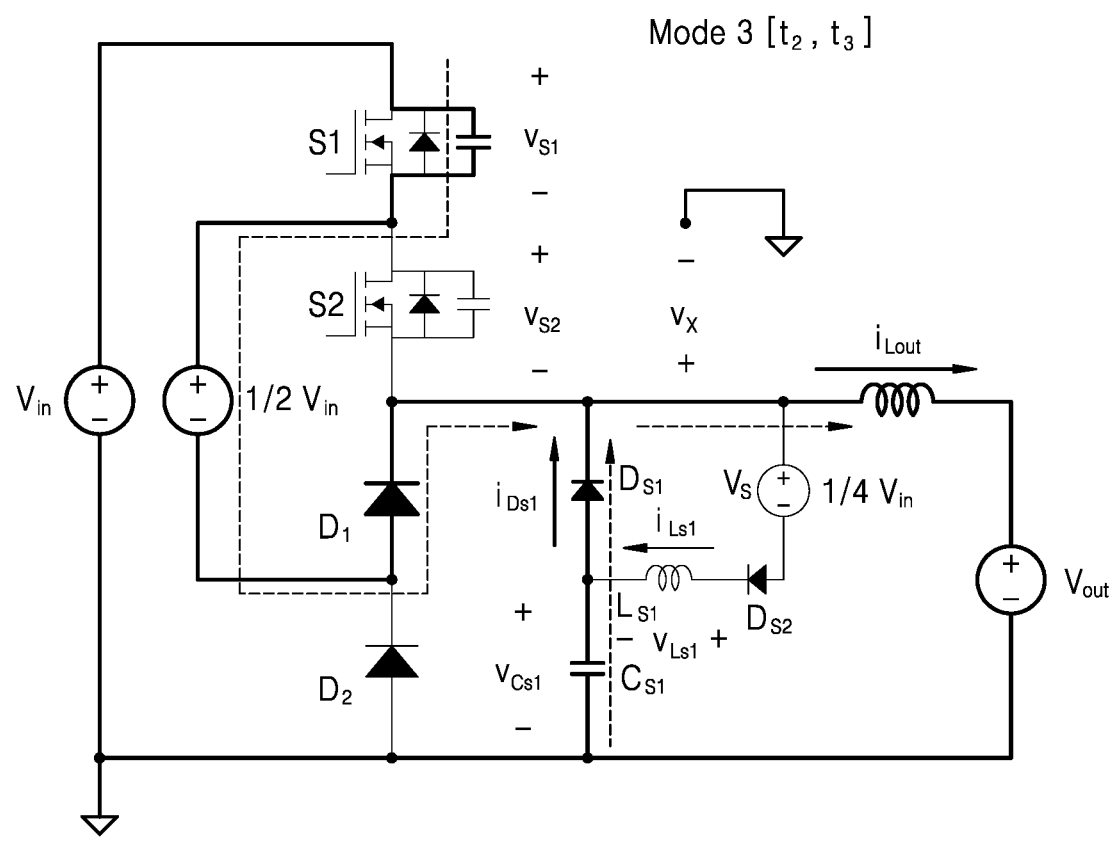
FIG. 3C is a diagram of a snubber circuit and a DC-DC converter according to an embodiment.

FIG. 3C is a diagram of a snubber circuit and a DC-DC converter according to an embodiment. Hereinafter, embodiments are described in relation to FIGS. 3C and 4.

In FIG. 3C, the bold solid line may represent a current path in which a current flows. Moreover, the dotted line in FIG. 3C may represent a flow of the inductor current $i_{Lout}$.

Mode 3 represents some of operations of the snubber circuit when the CR of the DC-DC converter is less than 0.5. Mode 3 may correspond to operations from the time point t2 to a time point t3 in FIG. 4.

In Mode 3, the switch S1 of the DC-DC converter may be changed to the turn-on state to the turn-off state. In this regard, without the snubber circuit, an excessive voltage may be applied to the switch S1 in an instant during the change from the turn-on state to the turn-off state. Due to this, the switch may be damages, and an electronic device including the DC-DC converter may experience malfunction.

In the snubber circuit according to an embodiment, by using the snubber capacitor $C_{s1}$, the switch of the DC-DC converter may be stably turned off. More specifically, the voltage of the snubber capacitor $C_{s1}$ which has been charged to $0.5*V_{in}$ may be discharged to 0 V. In this regard, despite the great inductor current $I_{Lout}$, the voltage at both ends of the switch S1 may have low switching noise, due to the snubber capacitor $C_{s1}$ having a capacitance sufficiently greater than the capacitance of the parasitic capacitor of the switch S1. In addition, the switch S1 may have a gradual voltage slope according to time. The voltage slope at both ends of the switch S1 according to time may be determined based on the size of the capacitance of the snubber capacitor $C_{s1}$ and the inductor current $I_{Lout}$. More specifically, the voltage slope at both ends of the switch S1 according to time may be proportional to the inductor current $I_{Lout}$ and inversely proportional to the size of the capacitance of the snubber capacitor $C_{s1}$. As such, when the voltage slope at both ends of the switch S1 according to time is gentle, the switching heat may be minimized, and the reliability of power elements may be improved.

Figure 3D:
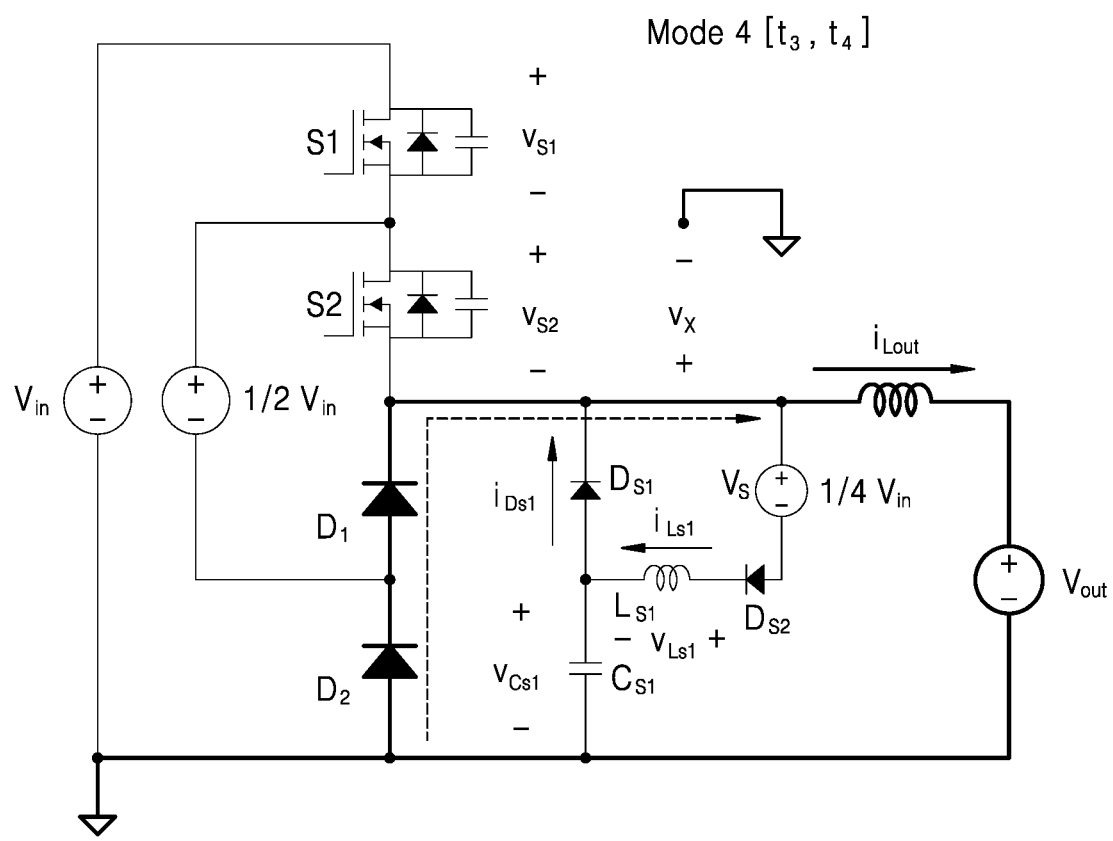
FIG. 3D is a diagram of a snubber circuit and a DC-DC converter according to an embodiment.

FIG. 3D is a diagram of a snubber circuit and a DC-DC converter according to an embodiment. Hereinafter, embodiments are described in relation to FIGS. 3D and 4.

In FIG. 3D, the bold solid line may represent a current path in which a current flows. Moreover, the dotted line in FIG. 3D may represent a flow of the inductor current $i_{Lout}$.

Mode 4 represents some of operations of the snubber circuit when the CR of the DC-DC converter is less than 0.5. Mode 4 may correspond to operations from the time point t3 to a time point t4 in FIG. 4.

Mode 4 may represent when the voltage of the snubber capacitor $C_{s1}$ is all discharged to 0 V. In this regard, the first snubber diode $D_{s1}$ may be turned off, and the diode $D_2$ of the DC-DC converter may be turned on. Accordingly, the inductor current $I_{Lout}$ may be supplied through the diode of the DC-DC converter.

Modes 1 to 4 represent operations related to a half cycle when the CR of the DC-DC converter is less than 0.5. More specifically, although it is not shown in the drawings, the DC-DC converter and the snubber circuit may operate in the same manner as in the switch S1 for the switch S2. Accordingly, the DC-DC converter does not need to provide a snubber circuit for each of the plurality of switches S1 and S2, and the DC-DC converter may have the snubber effect through one snubber circuit.

For example, the switch S2 of the DC-DC converter may be changed from a turn-off state to a turn-on state, and a diode $D_1$ of the DC-DC converter may be changed from a turn-on state to a turn-off state. When the switch S2 is turned on, the voltage of the first node $V_x$ may be $0.5*V_{in}$. In this regard, the initial voltage at both ends of the snubber inductor $L_{s1}$ may be $0.25*V_{in}$. In addition, resonance may occur in the snubber inductor $L_{s1}$ and the snubber capacitor $C_{s1}$. By the resonance of the snubber inductor $L_{s1}$ and the snubber capacitor $C_{s1}$, the snubber capacitor $C_{s1}$ may be charged. The resonance of the snubber inductor $L_{s1}$ and the snubber capacitor $C_{s1}$ may be due to the snubber voltage source Vs, the snubber inductor $L_{s1}$, and the snubber capacitor $C_{s1}$.

The current of the snubber inductor $L_{s1}$ may increase when the voltage at both ends of the snubber inductor $L_{s1}$ is $0.25*V_{in}$, and when the voltage at both ends of the snubber inductor $L_{s1}$ is $-0.25*V_{in}$, the current of the snubber inductor $L_{s1}$ may be initialized to 0. This may occur at the same time point when the snubber capacitor $C_{s1}$ is charged to $0.5*V_{in}$. The snubber capacitor $C_{s1}$ may be charged according to the resonance with the snubber inductor $L_{s1}$ without separate control.

After the snubber capacitor $C_{s1}$ is charged to $0.5*V_{in}$, the second snubber diode $D_{s2}$ may be turned off. Accordingly, the current may flow only among the components of the DC-DC converter.

Then, the switch S2 of the DC-DC converter may be changed to the turn-on state to the turn-off state. In this regard, without the snubber circuit, an excessive voltage may be applied to the switch S2 in an instant during the change of the switch S2 from the turn-on state to the turn-off state. Due to this, the switch may be damages, and an electronic device including the DC-DC converter may experience malfunction.

In the snubber circuit according to an embodiment, by using the snubber capacitor $C_{s1}$, the switch of the DC-DC converter may be stably turned off. More specifically, the voltage of the snubber capacitor $C_{s1}$ which has been charged to $0.5*V_{in}$ may be discharged to 0 V. In this regard, despite the great inductor current $I_{Lout}$, the voltage at both ends of the switch S2 may have low switching noise, due to the snubber capacitor $C_{s1}$ having a capacitance sufficiently greater than the capacitance of the parasitic capacitor of the switch S2.

In addition, the switch S2 may have a gradual voltage slope according to time. The voltage slope at both ends of the switch S2 according to time may be determined based on the size of the capacitance of the snubber capacitor $C_{s1}$ and the inductor current $I_{Lout}$. More specifically, the voltage slope at both ends of the switch S2 according to time may be proportional to the inductor current $I_{Lout}$ and inversely proportional to the size of the capacitance of the snubber capacitor $C_{s1}$. As such, when the voltage slope at both ends of the switch S2 according to time is gentle, the switching heat may be minimized, and the reliability of power elements may be improved.

Then, the first snubber diode $D_{s1}$ may be turned off, and the diode $D_1$ of the DC-DC converter may be turned on. Accordingly, the inductor current $I_{Lout}$ may be supplied through the diode of the DC-DC converter.

Figure 4:
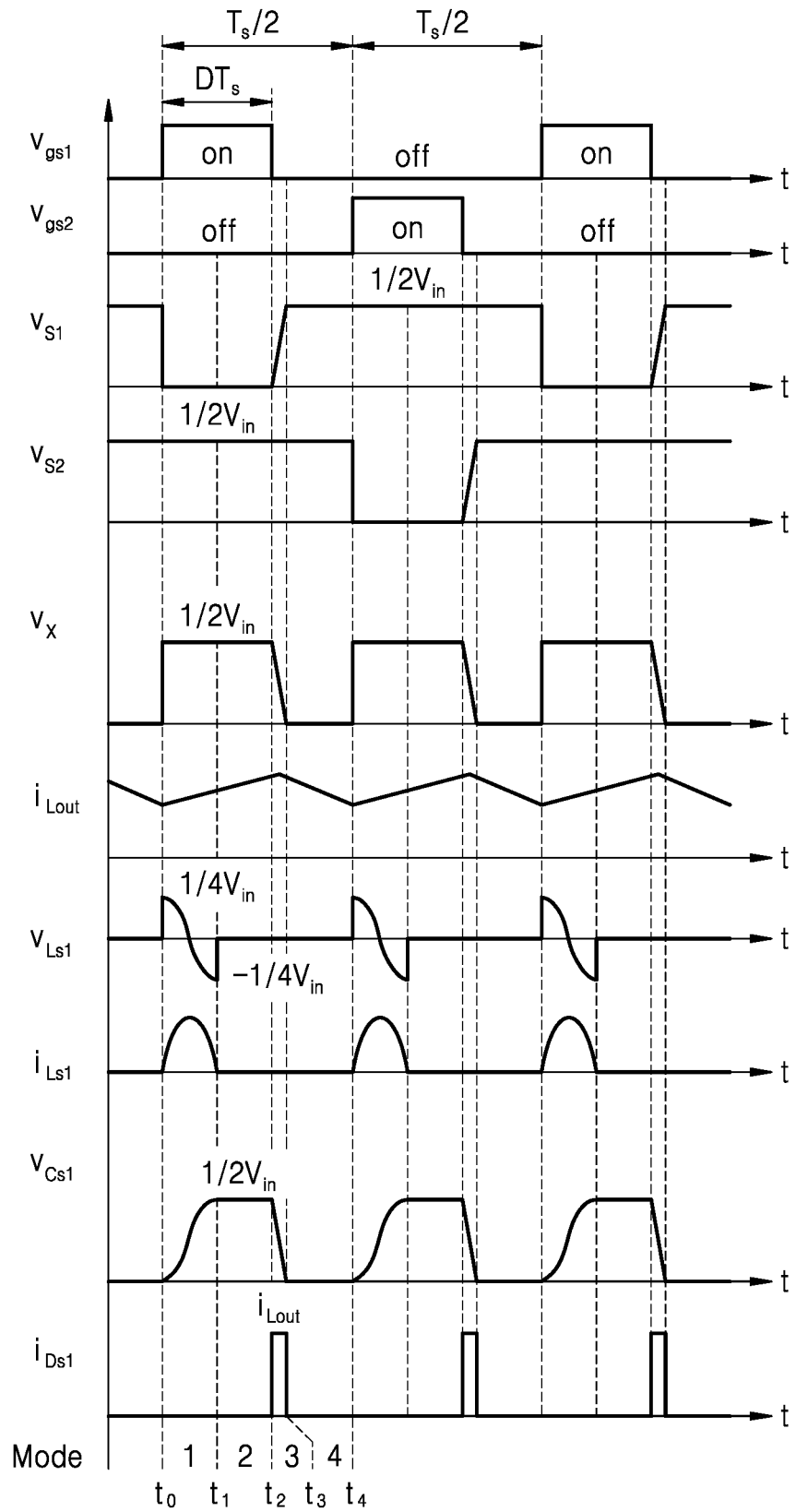
FIG. 4 is a timing chart illustrating an operation of a snubber circuit according to an embodiment.

FIG. 4 is a timing chart illustrating an operation of a snubber circuit according to an embodiment.

Referring to FIG. 4, $Vg_{s1}$ represents a signal for turning on and off the switch S1.

$Vg_{s2}$ represents a signal for turning on and off the switch S2. $V_{s1}$ represents of a voltage at both ends of the switch S1. $V_{s2}$ represents of a voltage at both ends of the switch S2. $V_x$ represents a voltage of the first node $V_x$. $i_{Lout}$ represents an inductor current. $VL_{s1}$ represents a voltage at both ends of the snubber inductor $L_{s1}$. $I_{Ls1}$ represents a current of the snubber inductor $L_{s1}$. $Vc_{s1}$ represents a voltage of the snubber capacitor $C_{s1}$. $i_{Ds1}$ represents a current of the first snubber diode $D_{s1}$.

As the embodiment of FIG. 4 has already been described above in relation to FIGS. 3A to 3D, any redundant description will be omitted.

Figure 5A:
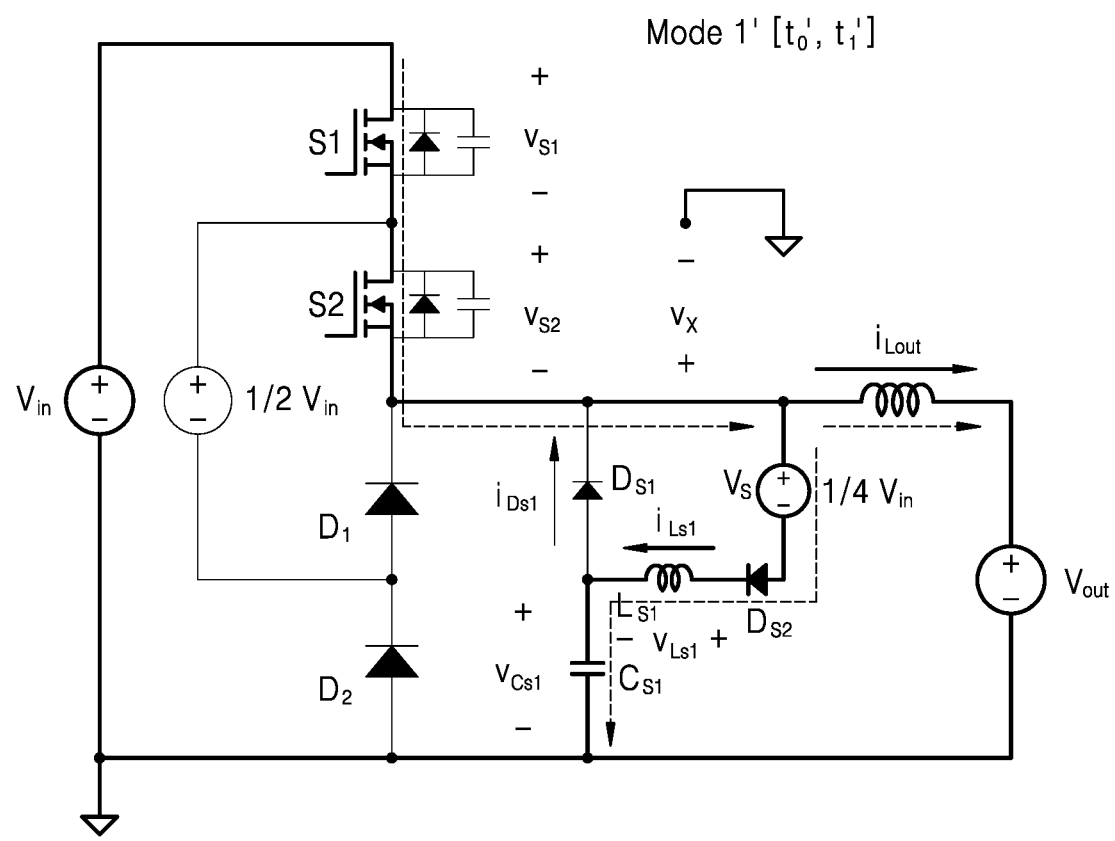
FIG. 5A is a diagram of a snubber circuit and a DC-DC converter according to an embodiment.

FIG. 5A is a diagram of a snubber circuit and a DC-DC converter according to an embodiment. Hereinafter, embodiments are described in relation to FIGS. 5A and 6.

In FIG. 5A, the bold solid line may represent a current path in which a current flows. Moreover, the dotted line in FIG. 5A may represent a flow of the inductor current $i_{Lout}$.

Hereinafter, the example in which the snubber circuit according to an embodiment is connected to a 3-level buck converter, which is a DC-DC converter, and operates accordingly is described for convenience in explanation.

Mode 1' represents some of operations of the snubber circuit when the CR of the DC-DC converter is greater than 0.5. Mode 1' may correspond to operations from a time point t0' to a time point t1' in FIG. 6.

Mode 1' may be a process to initialize the snubber capacitor $C_{s1}$ from $0.5*V_{in}$, which is a voltage 0.5 times the input voltage of the DC-DC converter to $V_{in}$. In Mode 1', the switch S1 of the DC-DC converter may be changed from a turn-off state to a turn-on state, and a diode $D_2$ of the DC-DC converter may be changed from a turn-on state to a turn-off state. When the switch S1 is turned on, the voltage of the first node $V_x$ may be changed from $0.5*V_{in}$ to $V_{in}$. In this regard, the initial voltage at both ends of the snubber inductor $L_{s1}$ may be $0.25*V_{in}$. In addition, resonance may occur the snubber inductor $L_{s1}$ and the snubber capacitor $C_{s1}$. By the resonance of the snubber inductor $L_{s1}$ and the snubber capacitor $C_{s1}$, the snubber capacitor $C_{s1}$ may be charged. The resonance of the snubber inductor $L_{s1}$ and the snubber capacitor $C_{s1}$ may be due to the snubber voltage source $V_s$, the snubber inductor $L_{s1}$, and the snubber capacitor $C_{s1}$.

The current of the snubber inductor $L_{s1}$ may increase when the voltage at both ends of the snubber inductor $L_{s1}$ is $0.25*V_{in}$, and when the voltage at both ends of the snubber inductor $L_{s1}$ is $-0.25*V_{in}$, the current of the snubber inductor $L_{s1}$ may be initialized to 0. This may occur at the same time point when the snubber capacitor $C_{s1}$ is charged to $V_{in}$. The snubber capacitor $C_{s1}$ may be charged according to the resonance with the snubber inductor $L_{s1}$ without separate control.

Figure 5B:
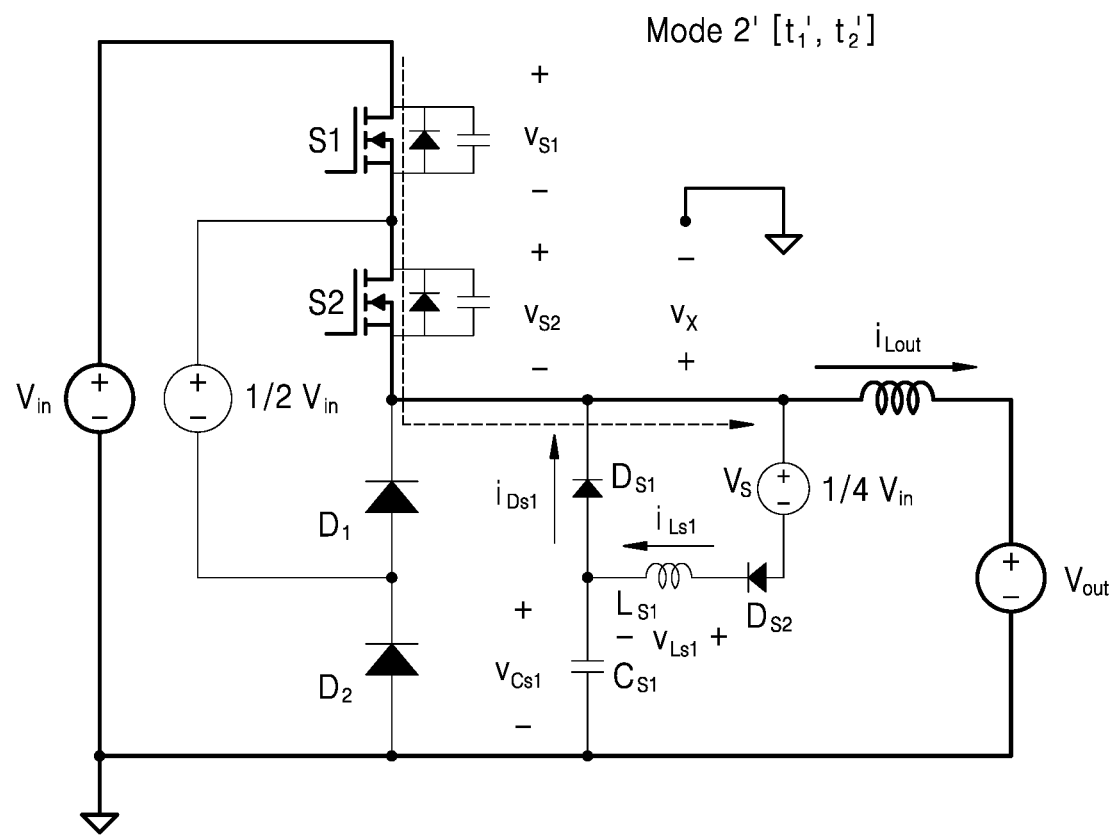
FIG. 5B is a diagram of a snubber circuit and a DC-DC converter according to an embodiment.

FIG. 5B is a diagram of a snubber circuit and a DC-DC converter according to an embodiment. Hereinafter, embodiments are described in relation to FIGS. 5B and 6.

In FIG. 5B, the bold solid line may represent a current path in which a current flows. Moreover, the dotted line in FIG. 5B may represent a flow of the inductor current $i_{Lout}$.

Mode 2' represents some of operations of the snubber circuit when the CR of the DC-DC converter is greater than 0.5. Mode 2' may correspond to operations from the time point t1' to a time point t2' in FIG. 6.

After the snubber capacitor $C_{s1}$ is charged to $V_{in}$ in Mode 1', the second snubber diode $D_{s2}$ may be turned off. Accordingly, the current may flow only among the components of the DC-DC converter.

Figure 5C:
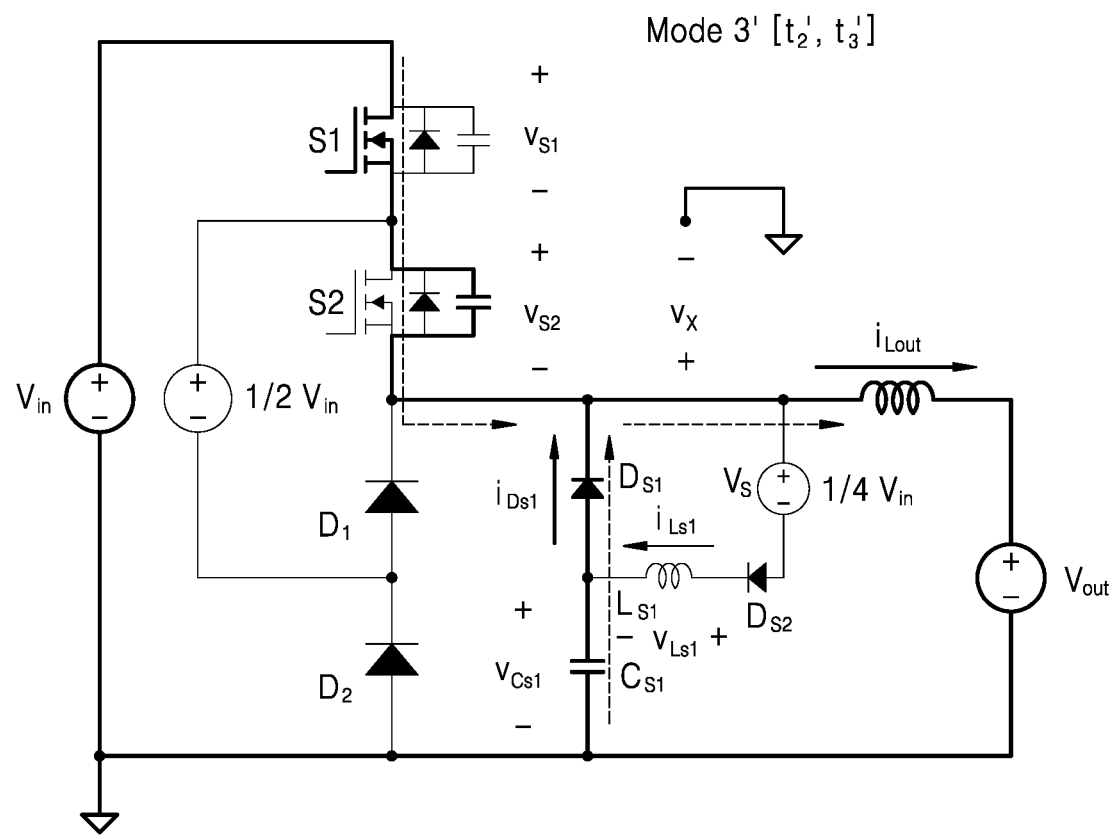
FIG. 5C is a diagram of a snubber circuit and a DC-DC converter according to an embodiment.

FIG. 5C is a diagram of a snubber circuit and a DC-DC converter according to an embodiment. Hereinafter, embodiments are described in relation to FIGS. 5C and 6.

In FIG. 5C, the bold solid line may represent a current path in which a current flows. Moreover, the dotted line in FIG. 5C may represent a flow of the inductor current $i_{Lout}$.

Mode 3' represents some of operations of the snubber circuit when the CR of the DC-DC converter is greater than 0.5. Mode 3' may correspond to operations from the time point t2' to a time point t3' in FIG. 6.

In Mode 3', the switch S2 of the DC-DC converter may be changed to the turn-on state to the turn-off state. In this regard, without the snubber circuit, an excessive voltage may be applied to the switch S2 in an instant during the change of the switch S2 from the turn-on state to the turn-off state. Due to this, the switch may be damages, and an electronic device including the DC-DC converter may experience malfunction.

In the snubber circuit according to an embodiment, by using the snubber capacitor $C_{s1}$, the switch of the DC-DC converter may be stably turned off. More specifically, the voltage of the snubber capacitor $C_{s1}$ which has been charged to $V_{in}$ may be discharged to $0.5*V_{in}$. In this regard, despite the great inductor current $I_{Lout}$, the voltage at both ends of the switch S2 may have low switching noise, due to the snubber capacitor $C_{s1}$ having a capacitance sufficiently greater than the capacitance of the parasitic capacitor of the switch S2.

In addition, the switch S2 may have a gradual voltage slope according to time. The voltage slope at both ends of the switch S2 according to time may be determined based on the size of the capacitance of the snubber capacitor $C_{s1}$ and the inductor current $I_{Lout}$. More specifically, the voltage slope at both ends of the switch S2 according to time may be proportional to the inductor current Lout and inversely proportional to the size of the capacitance of the snubber capacitor $C_{s1}$. As such, when the voltage slope at both ends of the switch S2 according to time is gentle, the switching heat may be minimized, and the reliability of power elements may be improved.

Figure 5D:
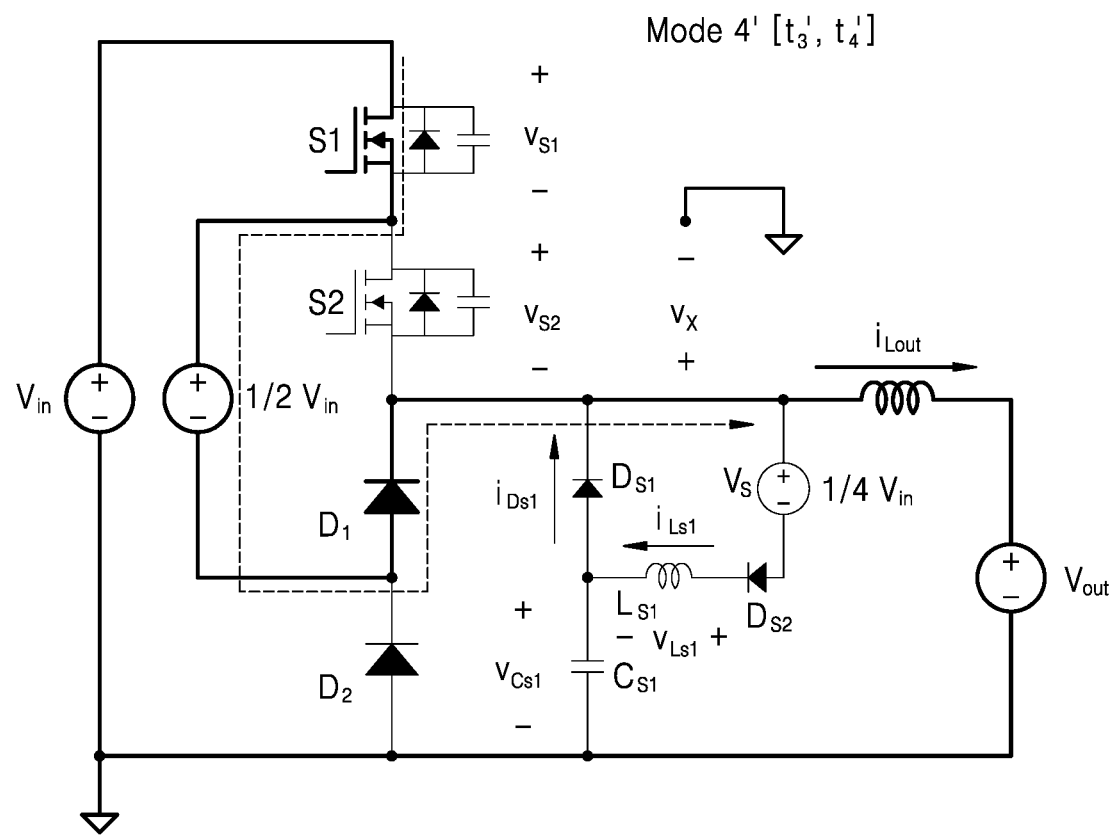
FIG. 5D is a diagram of a snubber circuit and a DC-DC converter according to an embodiment.

FIG. 5D is a diagram of a snubber circuit and a DC-DC converter according to an embodiment. Hereinafter, embodiments are described in relation to FIGS. 5D and 6.

In FIG. 5D, the bold solid line may represent a current path in which a current flows. Moreover, the dotted line in FIG. 5D may represent a flow of the inductor current $i_{Lout}$.

Mode 4' represents some of operations of the snubber circuit when the CR of the DC-DC converter is greater than 0.5. Mode 4' may correspond to operations from the time point t3' to a time point t4' in FIG. 6.

Mode 4' may represent when the voltage of the snubber capacitor $C_{s1}$ is discharged to $0.5*V_{in}$. In this regard, the first snubber diode $D_{s1}$ may be turned off, and the diode $D_1$ of the DC-DC converter may be turned on. Accordingly, the inductor current $I_{Lout}$ may be supplied through the diode of the DC-DC converter.

Modes 1' to 4' represent operations related to a half cycle when the CR of the DC-DC converter is greater than 0.5. More specifically, although it is not shown in the drawings, the DC-DC converter and the snubber circuit may operate in the same manner as in the switch S1 for the switch S2. Accordingly, the DC-DC converter does not need to provide a snubber circuit for each of the plurality of switches S1 and S2, and the DC-DC converter may have the snubber effect through one snubber circuit.

For example, the switch S2 of the DC-DC converter may be changed from a turn-off state to a turn-on state, and a diode $D_1$ of the DC-DC converter may be changed from a turn-on state to a turn-off state. When the switch S2 is turned on, the voltage of the first node $V_x$ may be changed from $0.5*V_{in}$ to $V_{in}$. In this regard, the initial voltage at both ends of the snubber inductor $L_{s1}$ may be $0.25*V_{in}$. In addition, resonance may occur in the snubber inductor $L_{s1}$ and the snubber capacitor $C_{s1}$. By the resonance of the snubber inductor $L_{s1}$ and the snubber capacitor $C_{s1}$, the snubber capacitor $C_{s1}$ may be charged. The resonance of the snubber inductor $L_{s1}$ and the snubber capacitor $C_{s1}$ may be due to the snubber voltage source $V_s$, the snubber inductor $L_{s1}$, and the snubber capacitor $C_{s1}$.

The current of the snubber inductor $L_{s1}$ may increase when the voltage at both ends of the snubber inductor $L_{s1}$ is $0.25*V_{in}$, and when the voltage at both ends of the snubber inductor $L_{s1}$ is $-0.25*V_{in}$, the current of the snubber inductor $L_{s1}$ may be initialized to 0. This may occur at the same time point when the snubber capacitor $C_{s1}$ is charged to $V_{in}$. The snubber capacitor $C_{s1}$ may be charged according to the resonance with the snubber inductor $L_{s1}$ without separate control.

After the snubber capacitor $C_{s1}$ is charged to $V_{in}$, the second snubber diode $D_{s2}$ may be turned off. Accordingly, the current may flow only among the components of the DC-DC converter.

Then, the switch S1 of the DC-DC converter may be changed to the turn-on state to the turn-off state. In this regard, without the snubber circuit, an excessive voltage may be applied to the switch S1 in an instant during the change of the switch S1 from the turn-on state to the turn-off state. Due to this, the switch may be damages, and an electronic device including the DC-DC converter may experience malfunction.

In the snubber circuit according to an embodiment, by using the snubber capacitor $C_{s1}$, the switch of the DC-DC converter may be stably turned off. More specifically, the voltage of the snubber capacitor $C_{s1}$ which has been charged to $V_{in}$ may be discharged to $0.5*V_{in}$. In this regard, despite the great inductor current $I_{Lout}$, the voltage at both ends of the switch S1 may have low switching noise, due to the snubber capacitor $C_{s1}$ having a capacitance sufficiently greater than the capacitance of the parasitic capacitor of the switch S1. In addition, the switch S1 may have a gradual voltage slope according to time. The voltage slope at both ends of the switch S1 according to time may be determined based on the size of the capacitance of the snubber capacitor $C_{s1}$ and the inductor current $I_{Lout}$. More specifically, the voltage slope at both ends of the switch S1 according to time may be proportional to the inductor current $I_{Lout}$ and inversely proportional to the size of the capacitance of the snubber capacitor $C_{s1}$. As such, when the voltage slope at both ends of the switch S1 according to time is gentle, the switching noise may be minimized, and the reliability of power elements may be improved.

Then, the first snubber diode $D_{s1}$ may be turned off, and the diode $D_2$ of the DC-DC converter may be turned on. Accordingly, the inductor current $I_{Lout}$ may be supplied through the diode of the DC-DC converter.

Figure 6:
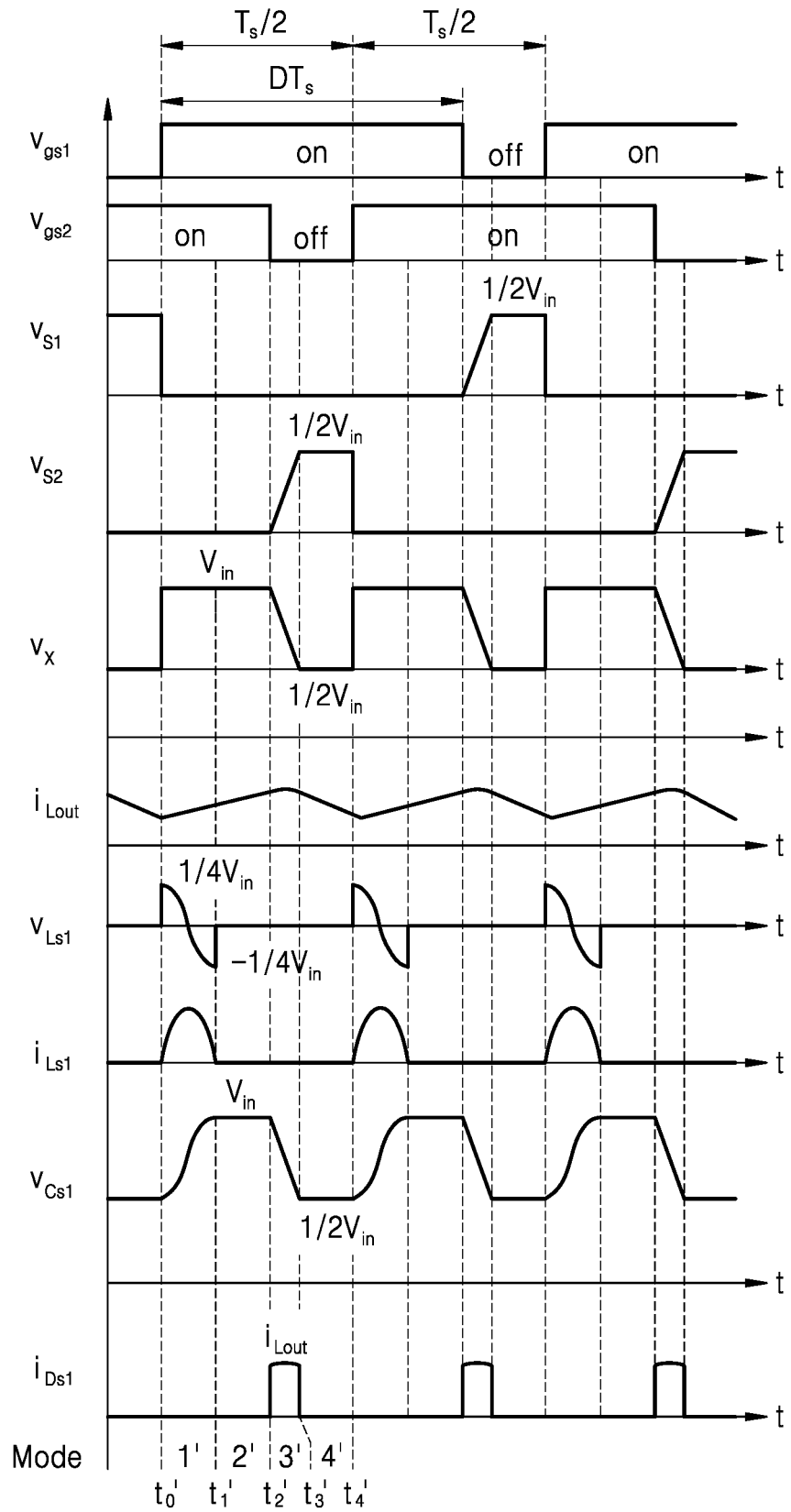
FIG. 6 is a timing chart illustrating an operation of a snubber circuit according to an embodiment.

FIG. 6 is a timing chart illustrating an operation of a snubber circuit according to an embodiment.

Referring to FIG. 6, $Vg_{s1}$ represents a signal for turning on and off the switch S1.

$Vg_{s2}$ represents a signal for turning on and off the switch S2. $V_{s1}$ represents of a voltage at both ends of the switch S1. $V_{s2}$ represents of a voltage at both ends of the switch S2. $V_x$ represents a voltage of the first node $V_x$. $i_{Lout}$ represents an inductor current. $VL_{s1}$ represents a voltage at both ends of the snubber inductor $L_{s1}$. $i_{Ls1}$ represents a current of the snubber inductor $L_{s1}$. $Vc_{s1}$ represents a voltage of the snubber capacitor $C_{s1}$. $i_{Ds1}$ represents a current of the first snubber diode $D_{s1}$.

As the embodiment of FIG. 6 has already been described above in relation to FIGS. 5A to 5D, any redundant description will be omitted.

Figure 7:
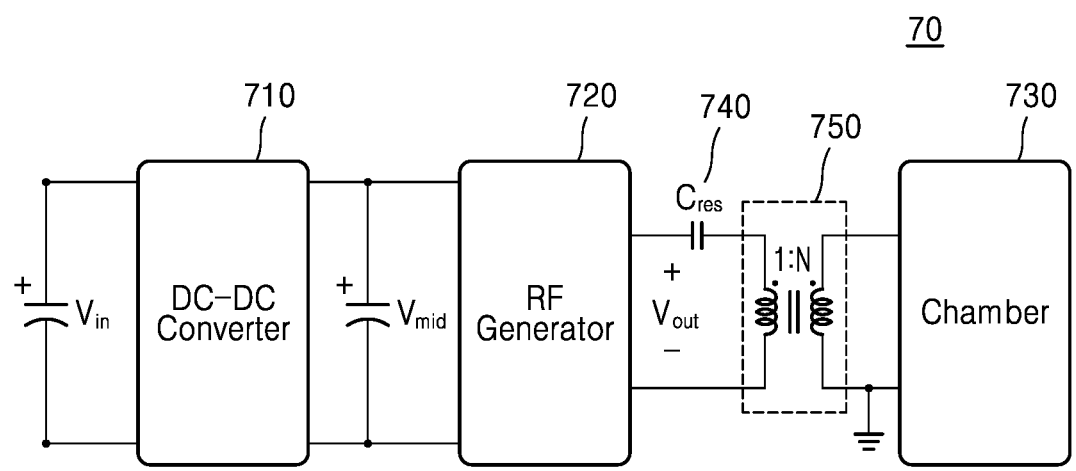
FIG. 7 is a diagram of a plasma generator according to an embodiment.

FIG. 7 is a diagram of a plasma generator according to an embodiment.

Referring to FIG. 7, a plasma generator 70 according to an embodiment may include a DC-DC converter 710, a radio frequency (RF) generator 720, a chamber 730, a resonance capacitor (Cres) 740, and/or a transformer 750.

The DC-DC converter 710 may convert a fixed direct current (DC) voltage into a variable DC voltage. For example, when a fixed DC voltage of 540 V is input to the DC-DC converter 710, the DC-DC converter 710 may generate a variable voltage of 100 V to 500 V. The DC-DC converter 710 may input the variable voltage to the RF generator 720 to prevent the RF generator 720 from receiving a high voltage all at once. More specifically, the DC-DC converter 710 may form a voltage slope regarding a voltage input to the RF generator 720. In other words, the DC-DC converter 710 may generate a middle voltage $V_{mid}$, which is a variable voltage, based on the input voltage $V_{in}$ and input the middle voltage $V_{mid}$ to the RF generator 720, and as the middle voltage $V_{mid}$ increases slowly from a voltage lower than the input voltage $V_{in}$, elements of the RF generator 720 may be prevented from receiving an excessive voltage. As the RF generator 720 is prevented from receiving an excessive voltage, the lifespan of power elements may be extended, and the stability of system may be guaranteed.

Although it is not shown in the drawings, the DC-DC converter 710 may be connected to a snubber circuit according to an embodiment. As described above, as the DC-DC converter 710 is connected to the snubber circuit, the switching noise and the switching heat may be minimized, and the reliability of power elements may be improved.

In addition, although it is not shown in the drawings, the DC-DC converter 710 may include a controller, and the controller may adjust a voltage of the DC-DC converter 710. For example, the controller may slowly increase an output voltage of the DC-DC converter 710 though a soft start-up method. The soft start-up method refers to a method of slowly increasing or decreasing a voltage instead of rapidly applying a voltage as in a pulse shape.

The RF generator 720 may receive a DC voltage and generate a pulse signal. For example, the RF generator 720 may generate a signal of 4000 kHz; however, the disclosure is not limited thereto.

The chamber 730 may include a gas for generating plasma. The chamber 730 may act as impedance and generate plasma based on an input voltage. For example, the chamber 730 may have impedance of 150Ω to 250Ω; however, the disclosure is not limited thereto.

The resonance capacitor 740 may change a waveform of an output signal of the RF generator 720. For example, the resonance capacitor 740 may change a waveform of square pulse shape to a waveform of sine wave shape.

The transformer 750 may transform a voltage. For example, the transformer 750 may transform a voltage applied from the RF generator 720 by N times and input the transformed voltage to the chamber 730.

Figure 8:
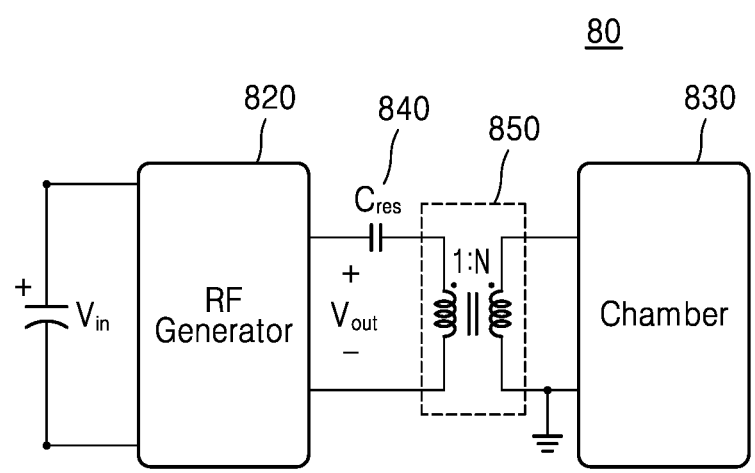
FIG. 8 is a diagram of a plasma generator according to a Comparative Example.

FIG. 8 is a diagram of a plasma generator according to a Comparative Example. Hereinafter, FIG. 8 is described in relation to FIG. 7.

Referring to FIG. 8, a plasma generator 80 may include a RF generator 820, a chamber 830, a resonance capacitor (Cres) 840, and a transformer 850.

Unlike the plasma generator 70, the plasma generator 80 may not include a DC-DC converter. Accordingly, the input voltage $V_{in}$, which is a fixed voltage, may be applied to the RF generator 820. As the input voltage $V_{in}$ is input to the RF generator 820 in a pulse shape, when a power switch is tuned on, a high voltage may be suddenly applied to the RF generator 820, which may lead to an overshoot and an undershoot. This may cause high-voltage stress to a switch, etc. included in the plasma generator 80, which may result in generation of large voltage spike at a parasitic inductance. Accordingly, the lifespan of elements included in the plasma generator 80 may be shortened, and a system malfunction may occur.

Unlike the foregoing, as the plasma generator 70 according to an embodiment includes the DC-DC converter 710, a voltage slope may be formed, and the RF generator 720 may be prevented from receiving a high voltage in pulse shape. The voltage slope will be further described in detail.

Figure 9A:
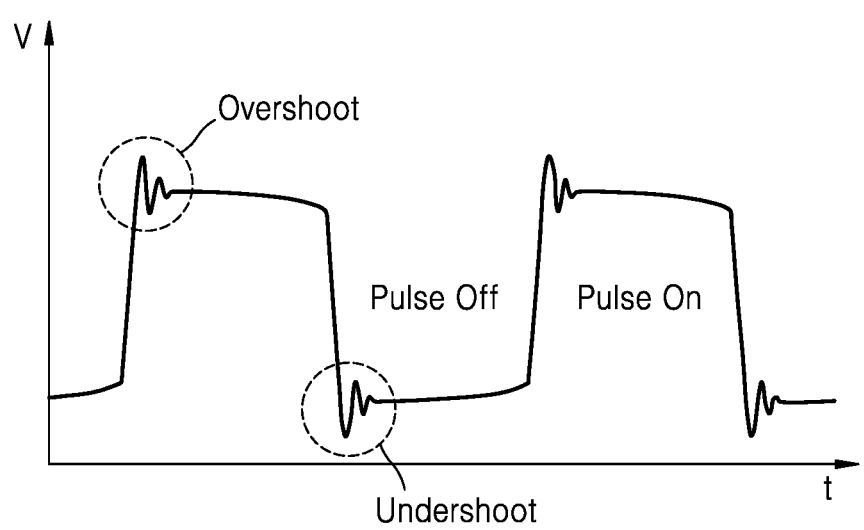
FIG. 9A is a diagram for explaining an operation of a plasma generator according to a Comparative Example.

FIG. 9A is a diagram for explaining an operation of a plasma generator according to a Comparative Example. Hereinafter, FIG. 9A is described in relation to FIG. 8.

Referring to FIGS. 8 and 9A, an overshoot and a undershoot may be caused to the plasma generator 80. This is due to an input of high voltage in pulse shape to the RF generator 820. As the plasma generator 70 according to an embodiment includes the DC-DC converter 710, an input of voltage in pulse shape to the RF generator may be prevented.

Figure 9B:
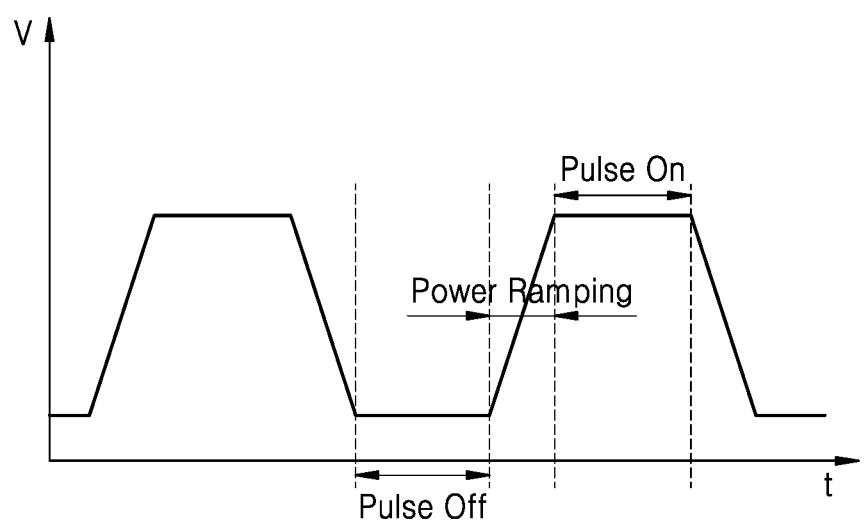
FIG. 9B is a diagram for explaining an operation of a plasma generator according to an embodiment.

FIG. 9B is a diagram for explaining an operation of a plasma generator according to an embodiment. Hereinafter, FIG. 9B is described in relation to FIG. 7.

Referring to FIGS. 7 and 9B, the plasma generator 70 according to an embodiment may form a power ramping by including the DC-DC converter 710. More specifically, the DC-DC converter 710 may generate a voltage slope by changing the input voltage $V_{in}$. By the DC-DC converter 710, a variable voltage having a voltage slope, instead of a voltage in pulse shape, may be applied to the RF generator 720, and the plasma generator 70 may operate stably.

Figure 10A:
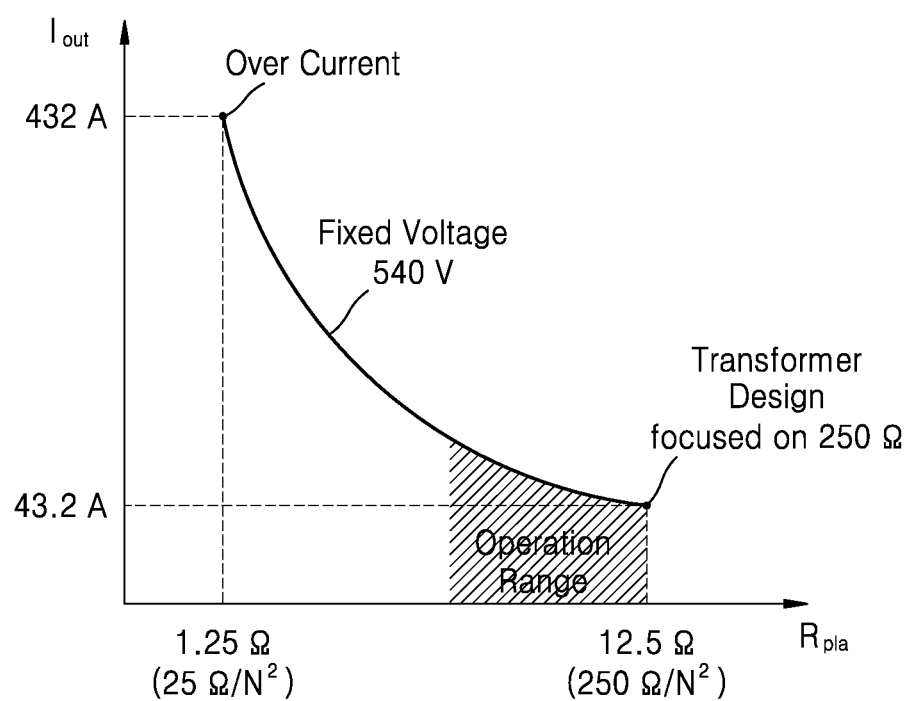
FIG. 10A is a diagram for explaining an operation of a plasma generator according to a Comparative Example.

FIG. 10A is a diagram for explaining an operation of a plasma generator according to a Comparative Example. Hereinafter, FIG. 10A is described in relation to FIG. 8.

Referring to FIGS. 8 and 10A, the plasma generator 80 may operate within a range which does not cause an over current. For example, the plasma generator 80 may operate when the input voltage $V_{in}$ is 540 V and the chamber 830 has resistance of 12.5Ω; however, when the input voltage $V_{in}$ is 540 V and the chamber 830 has resistance of 1.25Ω, due to the over current of 432 A, the plasma generator 80 may not operate.

Figure 10B:
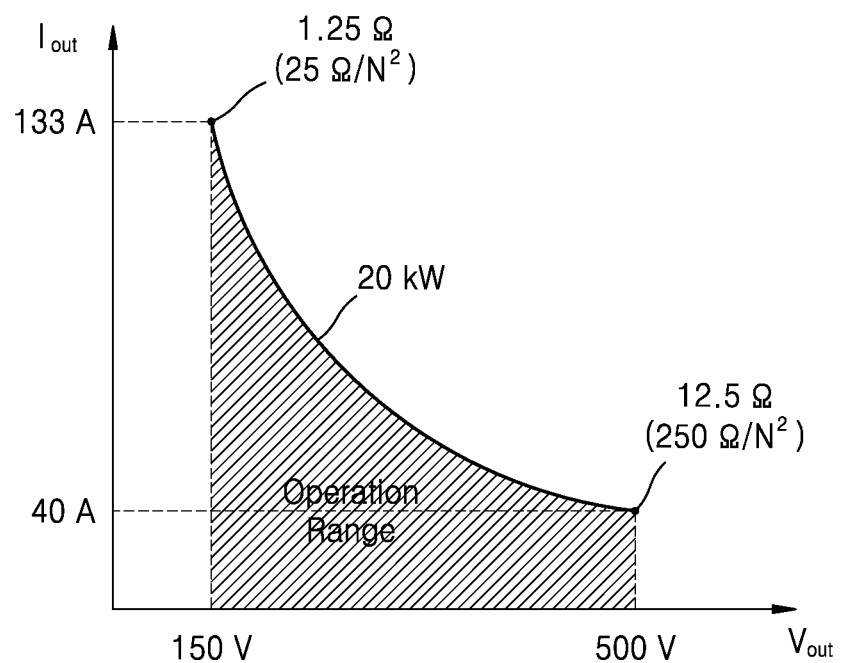
FIG. 10B is a diagram for explaining an operation of a plasma generator according to an embodiment.

FIG. 10B is a diagram for explaining an operation of a plasma generator according to an embodiment. Hereinafter, FIG. 10B is described in relation to FIG. 7.

Referring to FIGS. 7 and 101b, the plasma generator 70 according to an embodiment does not cause an over current, and thus, may have a wide operation range. For example, the plasma generator 70 may operate when the input voltage $V_{in}$ is 540 V and the chamber 730 has resistance of 12.5Ω, and even when the input voltage $V_{in}$ is 540 V and the chamber 730 has resistance of 1.25Ω, the plasma generator 70 may still operate by applying a low voltage.

Figure 11:
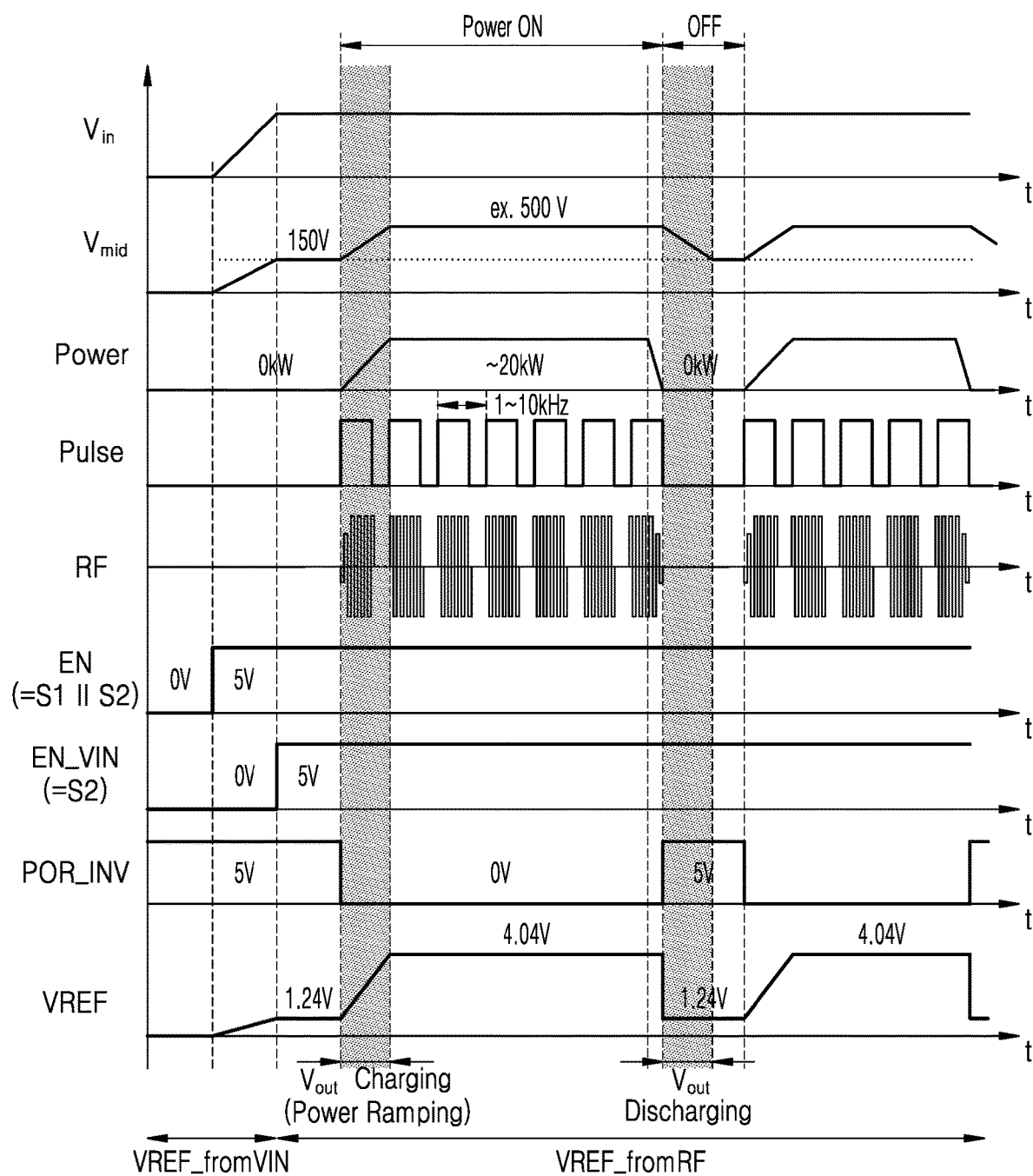
FIG. 11 is a diagram for explaining an operation of a plasma generator according to an embodiment.

FIG. 11 is a diagram for explaining an operation of a plasma generator according to an embodiment. Hereinafter, FIG. 11 is described in relation to FIG. 7.

Referring to FIGS. 7 and 11, as the plasma generator 70 has a voltage slope by the DC-DC converter 710, the plasma generator 70 may operate more stably. More specifically, by the DC-DC converter 710, a voltage $V_{mid}$ input to the RF generator 720 may increase from 150 V to 500 V, having a slope. However, the operation of the plasma generator 70 according to an embodiment is not limited by numeral values shown in the drawings, and these numerical values are provided merely as an example for convenience in description.

In FIG. 11, $V_{in}$ represents a fixed DC voltage input to the DC-DC converter 710. $V_{mid}$ represents an output voltage of the DC-DC converter 710, which is a variable voltage. Power represents power input to the RF generator 720.

EN represents an enable signal for inputting $V_{in}$, and EN_VIN represents an enable signal indicating that an input voltage has reached a target voltage (e.g., 540 V). POR_INV represents a signal capable of indicating whether power is input to the RF generator 720. VREF represents a reference voltage.

According the snubber circuit of the disclosure, by minimizing the switching noise and switching heat of the DC-DC converter, the reliability of power elements may be improved.

According to the snubber circuit of the disclosure, a high-efficiency snubber circuit may be provided to the DC-DC converter.

According to the snubber circuit of the disclosure, the snubber effect may be maintained in full range (CR>0.5 and CR<0.5) of a three or more levels DC-DC converter.

According to the snubber circuit of the disclosure, the snubber circuit may be simply designed, may be operated by using a controller related to the DC-DC converter, and may guarantee system reliability.

According to the plasma generator of the disclosure, as a voltage is applied to the RF generator through the soft start-up method, the plasma generator may operate stably.

According to the plasma generator of the disclosure, as the DC-DC converter change a voltage, the plasma generator may have a wide operation range.

Effects which may be achieve by the embodiments of the disclosure are not limited to the effects mentioned herein, and other effects which are not covered by the disclosure may be clearly understood and derived by a person skilled in the art. That is, unintended effected which may be caused by performing the embodiments of the disclosure may also be derived by a person skilled in the art.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A snubber circuit comprising:
a first snubber diode connected to a first node connected to a DC-DC converter;
a snubber capacitor connected between the first snubber diode and a second node connected to the DC-DC converter;
a snubber voltage source connected to the first node;
a snubber inductor connected to a third node between the first snubber diode and the snubber capacitor; and
a second snubber diode connected between the snubber inductor and the snubber voltage source.

2. The snubber circuit of claim 1, wherein the snubber voltage source is configured to supply a voltage that is 0.25 times an input voltage of the DC-DC converter.

3. The snubber circuit of claim 1, wherein the snubber capacitor is connected in parallel to a parasitic capacitor of a switch included in the DC-DC converter.

4. The snubber circuit of claim 1, wherein a capacitance of the snubber capacitor is 10 times or more than a capacitance of a parasitic capacitor of a switch included in the DC-DC converter.

5. The snubber circuit of claim 1, wherein, when a voltage at both ends of the snubber inductor is 0.25 times an input voltage of the DC-DC converter, resonance occurs in the snubber inductor and the snubber capacitor.

6. The snubber circuit of claim 5, wherein the snubber capacitor is charged according to the resonance.

7. The snubber circuit of claim 1, wherein, when a voltage at both ends of the snubber inductor is −0.25 times an input voltage of the DC-DC converter, a current of the snubber inductor becomes 0 A.

8. The snubber circuit of claim 7, wherein, when a conversion ratio of the DC-DC converter is less than 0.5 and the current of the snubber inductor becomes 0 A, the snubber capacitor is charged to a voltage that is 0.5 times the input voltage of the DC-DC converter, and
when the conversion ratio of the DC-DC converter is greater than 0.5 and the current of the snubber inductor becomes 0 A, the snubber capacitor is charged to a voltage that is identical to the input voltage of the DC-DC converter.

9. The snubber circuit of claim 8, wherein, when the conversion ratio of the DC-DC converter is less than 0.5 and a switch of the DC-DC converter is turned off, the snubber capacitor charged to the voltage that is 0.5 times the input voltage of the DC-DC converter is discharged to 0 V, and
when the conversion ratio of the DC-DC converter is greater than 0.5 and the switch of the DC-DC converter is turned off, the snubber capacitor charged to the voltage that is identical to the input voltage of the DC-DC converter is discharged to the voltage that is 0.5 times the input voltage of the DC-DC converter.

10. The snubber circuit of claim 1, wherein, when a conversion ratio of the DC-DC converter is less than 0.5, a voltage of the first node is maintained to be 0.5 times an input voltage of the DC-DC converter or at 0 V, and
when the conversion ratio of the DC-DC converter is greater than 0.5, the voltage of the first node is maintained to be identical to or 0.5 times the input voltage of the DC-DC converter.

11. The snubber circuit of claim 1, wherein, when a switch of the DC-DC converter is turned off, a voltage slope at both ends of the switch according to time is determined based on a size of a capacitance of the snubber capacitor and an inductor current of the DC-DC converter.

12. A snubber circuit comprising:
a snubber capacitor connected in parallel to a parasitic capacitor of a switch of a DC-DC converter;
a snubber inductor configured to cause resonance with the snubber capacitor;
a first snubber diode;
a second snubber diode; and
a snubber voltage source,
wherein the snubber capacitor is discharged when the switch of the DC-DC converter is turned off.

13. The snubber circuit of claim 12, wherein the snubber voltage source is configured to supply a voltage that is 0.25 times an input voltage of the DC-DC converter.

14. The snubber circuit of claim 12, wherein a capacitance of the snubber capacitor is 10 times or more than a capacitance of the parasitic capacitor of the switch included in the DC-DC converter.

15. The snubber circuit of claim 12, wherein, when a voltage at both ends of the snubber inductor is 0.25 times an input voltage of the DC-DC converter, resonance occurs in the snubber inductor and the snubber capacitor.

16. The snubber circuit of claim 15, wherein the snubber capacitor is charged according to the resonance.

17. The snubber circuit of claim 12, wherein, when a conversion ratio of the DC-DC converter is less than 0.5 and a current of the snubber inductor becomes 0 A, the snubber capacitor is charged to a voltage that is 0.5 times an input voltage of the DC-DC converter, and when the conversion ratio of the DC-DC converter is greater than 0.5 and the current of the snubber inductor becomes 0 A, the snubber capacitor is charged to a voltage that is identical to the input voltage of the DC-DC converter.

18. A plasma generator comprising:
a DC-DC converter configured to generate a middle voltage by converting an input direct current (DC) voltage;
a snubber circuit connected to the DC-DC converter;
a radio frequency (RF) generator configured to generate an alternating current (AC) voltage in response to receiving the middle voltage; and
a chamber in which plasma is generated based on the AC voltage,
wherein the snubber circuit comprises a first snubber diode connected to a first node connected to the DC-DC converter, a snubber capacitor connected between the first snubber diode and a second node connected to the DC-DC converter, a snubber voltage source connected to the first node, a snubber inductor connected to a third node between the first snubber diode and the snubber capacitor, and a second snubber diode connected between the snubber inductor and the snubber voltage source.

19. The plasma generator of claim 18, wherein the DC-DC converter is configured to generate, based on an input voltage, the middle voltage by increasing a voltage while forming a voltage slope.

20. The plasma generator of claim 18, wherein the snubber voltage source is configured to supply a voltage that is 0.25 times an input voltage of the DC-DC converter.

* * * * *